(12) United States Patent
Trautmann et al.

(10) Patent No.: US 9,772,835 B1
(45) Date of Patent: Sep. 26, 2017

(54) MODIFICATION OF PROGRAM CODE FOR EXECUTION IN A MULTI-TENANT OR DISTRIBUTED COMPUTING ENVIRONMENT

(71) Applicant: Amazon Technologies, Inc., Seattle, WA (US)

(72) Inventors: Tyson Christopher Trautmann, Seattle, WA (US); Jeremy Boynes, Mercer Island, WA (US); Diwakar Chakravarthy, Kirkland, WA (US); Jeenandra Kumar Uttamchand, Redmond, WA (US); Yi-Tao Wang, Seattle, WA (US); Soo Young Yang, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 207 days.

(21) Appl. No.: 13/800,783

(22) Filed: Mar. 13, 2013

(51) Int. Cl.
   *G06F 9/45* (2006.01)
   *G06F 9/445* (2006.01)

(52) U.S. Cl.
   CPC ............ *G06F 8/65* (2013.01); *G06F 8/60* (2013.01); *G06F 9/445* (2013.01)

(58) Field of Classification Search
   CPC ...... G06F 70/30575; G06F 8/60; G06F 9/445; G06F 8/65
   See application file for complete search history.

(56) References Cited

U.S. PATENT DOCUMENTS

| | | | | |
|---|---|---|---|---|
| 5,457,797 | A * | 10/1995 | Butterworth | G06F 9/5027 709/226 |
| 6,684,259 | B1 * | 1/2004 | Discavage | G06F 9/45537 709/201 |
| 7,209,248 | B1 * | 4/2007 | Govindarajan | G06F 9/5022 358/1.15 |
| 7,596,790 | B2 * | 9/2009 | Moakley | G06F 9/45533 709/201 |

(Continued)

OTHER PUBLICATIONS

Bart Platzbeecker et al., "Enabling Multi-Tenancy: an Industrial Experience Report", [Online], 2010, pp. 1-8, [Retrieved from Internet on Mar. 22, 2016], <http://ieeexplore.ieee.org/stamp/stamp.jsp?tp=&arnumber=5609735>.*

(Continued)

*Primary Examiner* — Ziaul A Chowdhury
(74) *Attorney, Agent, or Firm* — Lee & Hayes, PLLC

(57) ABSTRACT

Program code, such the program code of an application program, can be modified to permit the program code to execute in a multi-tenant execution environment. For example, program code might be modified at compile time, run time, or at another time, in order to enable the program code to properly operate in an execution environment in which applications might be simultaneously executed in process by multiple tenants. Program code might also be modified at run time to enable the program code to execute in a distributed fashion in a distributed computing environment. For example, portions of the program code might be configured at run time to execute in different instances of an execution environment. The program code might be modi- (Continued)

COMPILE TIME MODIFICATION OF PROGRAM CODE FOR EXECUTION IN A MULTI-TENANT EXECUTION ENVIRONMENT fied at run time to enable the program code to properly execute in multiple instances of the execution environment.

20 Claims, 7 Drawing Sheets

(56) References Cited

U.S. PATENT DOCUMENTS

| | | | | |
|---|---|---|---|---|
| 9,207,946 | B2* | 12/2015 | Davis | G06F 9/44 |
| 2002/0026478 | A1* | 2/2002 | Rodgers | G06F 8/65 |
| | | | | 709/205 |
| 2004/0172618 | A1* | 9/2004 | Marvin | G06F 8/36 |
| | | | | 717/116 |
| 2005/0039186 | A1* | 2/2005 | Borkan | G06F 11/3476 |
| | | | | 719/310 |
| 2005/0188345 | A1* | 8/2005 | Chang et al. | 717/101 |
| 2005/0262100 | A1* | 11/2005 | Piper | G06F 9/5027 |
| 2007/0277181 | A1* | 11/2007 | Feigen | G06F 9/542 |
| | | | | 719/314 |
| 2008/0086482 | A1* | 4/2008 | Weissman | 707/10 |
| 2008/0201701 | A1* | 8/2008 | Hofhansl | G06F 8/60 |
| | | | | 717/168 |
| 2008/0270459 | A1* | 10/2008 | Grewal | G06F 17/30566 |
| 2008/0270987 | A1* | 10/2008 | Weissman | 717/124 |
| 2010/0162233 | A1* | 6/2010 | Ku | G06F 8/60 |
| | | | | 717/178 |
| 2010/0241827 | A1* | 9/2010 | Yu | H04L 12/44 |
| | | | | 712/30 |
| 2010/0281458 | A1* | 11/2010 | Paladino | G06F 8/71 |
| | | | | 717/106 |
| 2011/0213870 | A1* | 9/2011 | Cai et al. | 709/223 |
| 2011/0265164 | A1* | 10/2011 | Lucovsky | G06F 9/45533 |
| | | | | 726/7 |
| 2011/0270886 | A1* | 11/2011 | An et al. | 707/785 |
| 2012/0136602 | A1* | 5/2012 | Hossain et al. | 702/85 |
| 2012/0144023 | A1* | 6/2012 | Guest | H04L 61/1511 |
| | | | | 709/224 |
| 2012/0144374 | A1* | 6/2012 | Gallagher et al. | 717/128 |
| 2013/0066770 | A1* | 3/2013 | Das et al. | 705/39 |
| 2013/0067599 | A1* | 3/2013 | Raje | G06F 8/65 |
| | | | | 726/29 |
| 2013/0080641 | A1* | 3/2013 | Lui | G06F 9/505 |
| | | | | 709/226 |
| 2013/0081109 | A1* | 3/2013 | Venkataraman | G06F 17/3056 |
| | | | | 726/4 |
| 2013/0145006 | A1* | 6/2013 | Tammam | G06F 9/5027 |
| | | | | 709/223 |
| 2013/0198719 | A1* | 8/2013 | Raman | 717/121 |
| 2013/0198763 | A1* | 8/2013 | Kunze | G06F 8/60 |
| | | | | 719/318 |
| 2013/0227635 | A1* | 8/2013 | Walsh | G06F 9/455 |
| | | | | 726/1 |
| 2013/0238641 | A1* | 9/2013 | Mandelstein et al. | 707/756 |
| 2013/0325790 | A1* | 12/2013 | Srinivasan | G06F 17/3056 |
| | | | | 707/602 |
| 2014/0075432 | A1* | 3/2014 | McGrath | G06F 9/455 |
| | | | | 718/1 |
| 2014/0075446 | A1* | 3/2014 | Wang et al. | 718/104 |

OTHER PUBLICATIONS

Stefan Walraven et al. "A Middleware Layer for Flexible and Cost-efficient Multi-Tenant Applications", [Online], Springer 2011, pp. 1-20, [Retrieved from Internet on Mar. 29, 2017, <https://lirias.kuleuven.be/bitstream/123456789/313768/3/MW11_stefan.walraven.pdf>.*

Julia Schroeter et al., "Towards Modeling a Variable Architecture for Multi-Tenant SaaS-Applications", [Online], ACM 2012, pp. 1-10, [Retrieved from Interent on Mar. 29, 2017), <http://delivery.acm.org/10.1145/2120000/2110160/p111-schroeter.pdf>.*

Sungjoo Kang et al., "A Design of the Conceptual Architecture for a Multitenant SaaS Application Platform", [Online], IEEE 2011, pp. 462-467, [Retrieved from Internet on Mar. 29, 2017], <http://ieeexplore.ieee.org/stamp/stamp.jsp?arnumber=5954363>.*

Rouven Krebs et al., "Resource Usage Control in Multi-Tenant Applications", [Online], IEEE 2014, pp. 122-131, [Retrieved from Internet on Mar. 29, 2017, <http://ieeexplore.ieee.org/stamp/stamp.jsp?arnumber=6846447>.*

* cited by examiner

MODIFICATION OF PROGRAM CODE FOR EXECUTION IN A MULTI-TENANT OR DISTRIBUTED COMPUTING ENVIRONMENT

BACKGROUND

Various types of execution environments can be utilized to execute software applications. Execution environments can provide functionality for not only executing applications, but also for managing application execution and for providing other types of functionality. For example, one type of execution environment is an application container. Application containers typically provide functionality for loading application dependencies, interconnecting applications at run time, and for managing application lifecycles, including integrated application deployment and eviction. Standard configuration mechanisms can typically be utilized to access this functionality.

Executing application programs in an execution environment, such as an application container, may provide benefits over executing applications using traditional application architectures. For example, executing applications in an application container might permit applications to be decoupled from particular implementations by configuring the application container to inject implementations at run time, might permit applications to be constructed and deployed in a modular fashion by deploying the modules to an application container independently and interconnecting the modules at run time, and might permit multiple tenants to execute applications in the same application container, thereby sharing common frameworks in memory and potentially reducing resource utilization.

A unique set of challenges exists when utilizing execution environments, such as application containers, that host applications used by multiple tenants in a single process. For example, managing applications in an application container might require insight into the behavior of each application, which can be difficult to ascertain without process-level metrics that may be unavailable when multiple tenants utilize applications in the same container. Moreover, legacy application programs that are written under the assumption that they will be running on behalf of a single tenant in a process can fail when executed in a multi-tenant execution environment, such as a container executing applications for multiple tenants, for a variety of reasons. Other challenges might also be presented when application programs are executed in execution environments in a distributed computing environment. For example, it might be difficult to scale the execution of application programs in a distributed computing environment, where components might be executed in a distributed fashion on multiple local or remotely located computing systems.

The disclosure made herein is presented with respect to these and other considerations.

DETAILED DESCRIPTION

Figure 1:
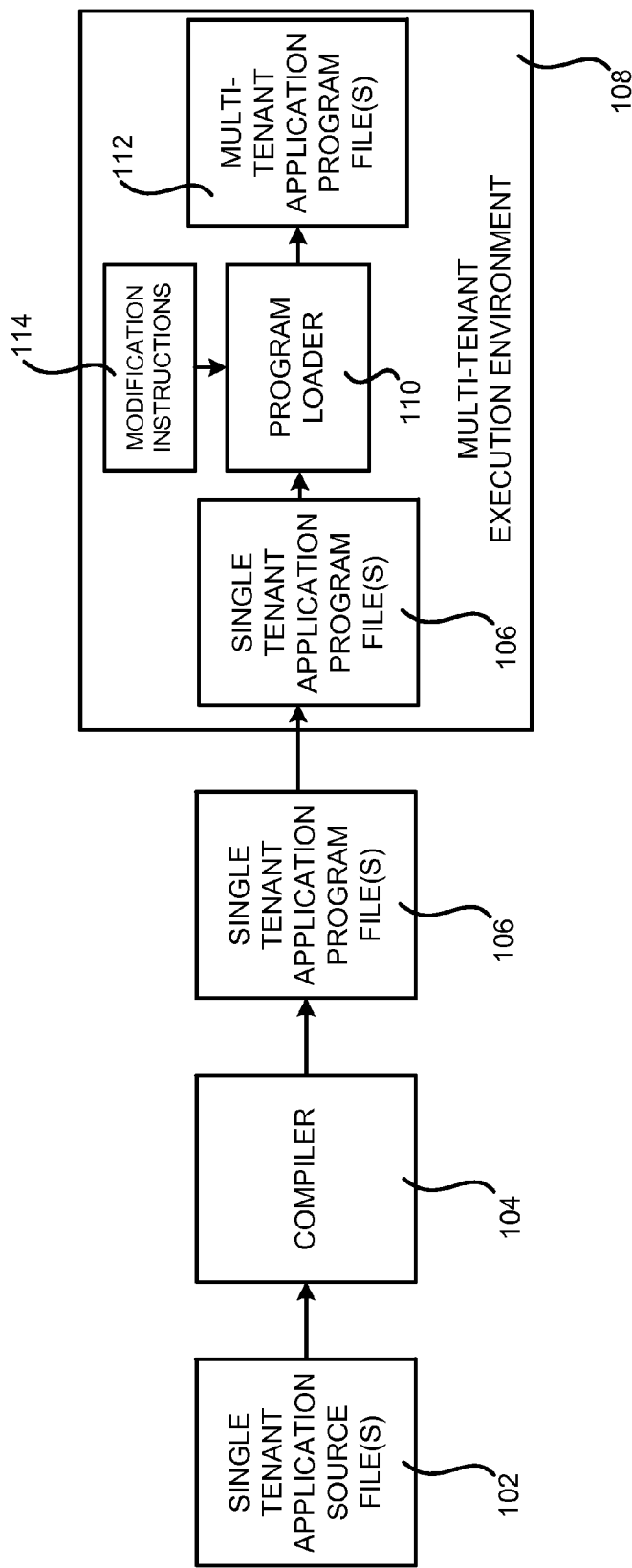
FIG. 1 is a software architecture diagram showing aspects of one illustrative mechanism described herein for modification of program code at run time for execution in a multi-tenant execution environment.

The following detailed description is directed to technologies for modification of program code, such as an application program, for execution in multi-tenant or distributed computing environments. Utilizing the technologies described herein, program code not specifically created for execution within a multi-tenant execution environment can be modified for execution within a multi-tenant execution environment, such as an application container executing applications for multiple tenants. In a similar fashion, program code not specifically created for distributed execution can be modified for distributed execution in a distributed computing environment. As will be described in greater detail below, program code might be modified at compile time, at run time, during a pre-processing stage, or at another time, for execution within a multi-tenant execution environment and/or for distributed execution.

According to one aspect presented herein, a computer-implemented mechanism is disclosed for modifying program code for execution in a multi-tenant execution environment. In particular, program code that has not been specifically created for execution in a multi-tenant execution environment and which, therefore, might execute improperly in the multi-tenant execution environment, may be modified for proper execution in the multi-tenant execution environment. The program code may be modified at compile time, at the time the program code is deployed into the multi-tenant execution environment, at run time, or at another time.

In one particular implementation, the execution environment is an application container (which might also be called a "Web container"). As mentioned above, application containers can provide functionality for executing applications, loading application dependencies, interconnecting applications at run time, for managing application lifecycles, including integrated application deployment and eviction, and other types of functionality. A multi-tenant application container is an application container configured to execute applications in process on behalf of two or more tenants. It should be appreciated that while the embodiments disclosed herein are primarily presented in the context of a multi-tenant application container, the embodiments disclosed herein might also be utilized with other types of multi-tenant execution environments.

According to various embodiments, program code might be modified in various ways to enable proper execution in a multi-tenant execution environment. For example, the program code might be modified to provide instrumentation data regarding the utilization of resources by the program code. The program code might also be modified to provide a per-tenant resource for a global resource defined by the application. For instance, the program code might be modified to provide per-tenant variables for static variables defined by the program code and/or to translate requests for process identifiers to requests for application identifiers. The program code might also be modified to propagate context information to a thread local storage area associated with a thread created by the program code. The program code might also be modified in other ways in order to enable the program code to properly execute within the multi-tenant application container.

According to another aspect presented herein, a computer-implemented mechanism is disclosed for modifying program code for distributed execution in a distributed computing environment. Through an implementation of this mechanism, program code, like an application program, not specifically programmed for distributed execution might be modified at run time to permit distributed execution of the program code. For example, in one particular implementation, an application program may be executed in an execution environment, such as an application container, in a distributed computing environment.

During run time of the application, a determination may be made as to whether a portion of the application is to be executed in another instance of the execution environment in the distributed computing environment. For example, if run time context data indicates that a portion of the application, like a component, module, function, or other subdivision of the application, is in high demand, a determination may be made to execute the portion of the application in another instance of the execution environment. In some implementations, the application is modified at run time to generate the run time context data.

If a determination is made to execute a portion of the application in another instance of the execution environment, the portion of the application is then moved to the other instance of the execution environment. For example, a component of an application might be moved from one application container to a second application container for execution on another server computer in the distributed execution environment. Other portions of an application might also be moved to instances of other execution environments in a distributed computing environment in a similar fashion.

Once the portion of the application has been moved to the other instance of the execution environment, the application, and the moved portion of the application, may be modified at run time in order to permit the application to execute properly in the distributed computing environment. For example, program code in the application for communicating with the moved portion of the application might be modified to perform network calls, rather than local calls, to the moved portion of the application. Other types of modifications might also be performed on the application, and/or the moved portion of the application, in order to permit the application to properly execute in a distributed fashion. Additional details regarding the various components and processes described above for modification of program code for execution in multi-tenant or distributed environments will be presented below with regard to FIGS. 1-7.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special-purposed hardware devices, network appliances, and the like. As mentioned briefly above, the embodiments described herein may be practiced in distributed computing environments, where tasks may be performed by remote computing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures (which may be referred to herein as a "FIG." or "FIGS.").

FIG. 1 is a software architecture diagram showing aspects of one illustrative mechanism described herein for modification of program code at run time for execution in a multi-tenant execution environment 108. In the embodiment shown in FIG. 1, program code, such as an application program, that has not been specifically created for execution in a multi-tenant execution environment 108 may be modified for proper execution in the multi-tenant execution environment 108. The program code may be modified at run time, as described with regard to FIGS. 1 and 2, or at compile time as described below with regard to FIGS. 3 and 4. The program code might also be modified in the manner described herein at the time the program code is deployed into the multi-tenant execution environment 108, during a pre-preprocessing operation, at load time, after load time but before compile time, or at another time altogether.

As mentioned briefly above, the multi-tenant execution environment 108 is a multi-tenant application container in one embodiment. As also mentioned above, application containers can provide functionality for executing applications, loading application dependencies, interconnecting applications at run time, for managing application lifecycles, including integrated application deployment and eviction, communication support, multi-threading support, declarative security, and other types of functionality. A multi-tenant application container is an application container configured to execute applications in process on behalf of two or more tenants.

It should be appreciated that application containers are available for use in many development environments. For example, application containers are commonly available that utilize the JAVA programming language from ORACLE CORPORATION. Examples of application containers include, but are not limited to WEBSPHERE from IBM CORPORATION, SPRING FRAMEWORK from VMWARE CORPORATION, GUICE from GOOGLE CORPORATION, the PICOCONTAINER and PLEXUS projects from CODEHAUS, the FELIX, TOMCAT, TOMEE and GERONIMO projects from the APACHE SOFTWARE FOUNDATION, EQUINOX, GEMINI, JETTY and ECLIPSE from the ECLIPSE FOUNDATION, JBOSS from REDHAT CORPORATION, and GLASSFISH, WEBLOGIC, and FUSION from ORACLE CORPORATION. Although the embodiments disclosed herein are primarily presented in the context of a multi-tenant application container, the embodiments disclosed herein might also be utilized with other types of multi-tenant execution environments 108.

As described briefly above, a unique set of challenges exists when utilizing multi-tenant execution environments 108, such as application containers, that host applications used by multiple tenants in a single process. For example, and as mentioned above, managing applications in an application container might require insight into the behavior of each application, which can be difficult to ascertain without process-level metrics that may be unavailable when multiple tenants utilize applications in the same container. Moreover, legacy application programs that are written under the assumption that they will be running for a single tenant in a process can fail when executed in a multi-tenant execution environment 108, such as a container executing applications for multiple tenants, for a variety of reasons. Some embodiments disclosed herein address these and other considerations associated with executing program code that has not been specifically designed for execution in a multi-tenant execution environment 108.

In the embodiment shown in FIG. 1, for instance, a single tenant application source file 102 (which may be referred to herein as the "source file 102") has been created that is not specifically programmed for execution in the multi-tenant execution environment 108. The source file 102 might be created using the JAVA programming language or another programming language suitable for programming applications for execution in an execution environment, such as an application container. Because the source file 102 has not been created specifically for use with the multi-tenant execution environment 108, execution of the compiled source file 102 in the multi-tenant execution environment 108 might cause the program code to execute improperly.

In order to address the problem described above, the source file 102 is modified at run time in one embodiment in order to enable proper execution of the program code in the multi-tenant execution environment 108. In particular, a compiler 104 first compiles the source file 102 in one embodiment. The compiler 104 might compile the source file 102 to a single tenant application program file 106 (referred to as the "program file 106") or another type of intermediate file type in some implementations. In this embodiment, the source file 102 is not modified at compile time, so the program file 106 remains potentially incompatible with execution in the multi-tenant execution environment 108.

Once the program file 106 has been generated, the program file 106 is deployed into the multi-tenant execution environment 108 for execution. For example, in one particular implementation, the program file 106 is deployed into a multi-tenant application container for execution with other applications. Multiple tenants might execute the applications in the multi-tenant application container concurrently. Once the program file 106 has been deployed in the multi-tenant execution environment 108, a program loader 110 may load and execute the program file 106 by converting the program file 106 to machine-specific instructions.

In some embodiments, modification instructions 114 are provided for use in modifying the program file 106 at run time for proper execution within the multi-tenant execution environment 108. The modification instructions 114 specify the modifications that should be performed to program code, such as the program file 106, to enable the program code to execute properly in the multi-tenant execution environment 108. As shown in FIG. 1, the program loader 110 consumes the modification instructions 114 in one embodiment, and utilizes the modification instructions 114 to modify the program file 106 for proper execution in the multi-tenant execution environment 108. The result of the modification is a multi-tenant application program file 112 (referred to as a "program file 112") that is suitable for execution within the multi-tenant execution environment 108.

In embodiments wherein the source file 102 is expressed utilizing the JAVA programming language, the program file loader 110 might utilize JAVA byte code weaving in order to generate the program file 112 from the program file 106. Other similar mechanisms might also be utilized in conjunction with other programming languages in order to modify program code at run time. Details regarding the various types of modifications that might be performed in order to permit the program file 106 to execute properly in the multi-tenant execution environment 108 will be provided below with regard to FIG. 2.

It should be appreciated that the program file 106 might be an intermediate representation ("IR") that is either interpreted or just-in-time ("JIT") compiled. In other implementations, the program file 106 might be directly executable on the hardware of a computing system, such as assembly language. In this regard, it should also be appreciated that the embodiments described herein are not dependent upon the type of program code contained in the program file 106.

It should also be appreciated that, in some embodiments, a pre-processing operation might be performed to determine whether the source file 102 is compatible with execution in the multi-tenant execution environment 108. If the source file 102 is suitable for execution in the multi-tenant execution environment 108, the various processing operations described herein may not be performed on the program file 106 generated from the source file 102. This type of determination might also be made prior to modifying the program file 106 at run time in the manner described below with regard to FIGS. 3 and 4.

Figure 2:
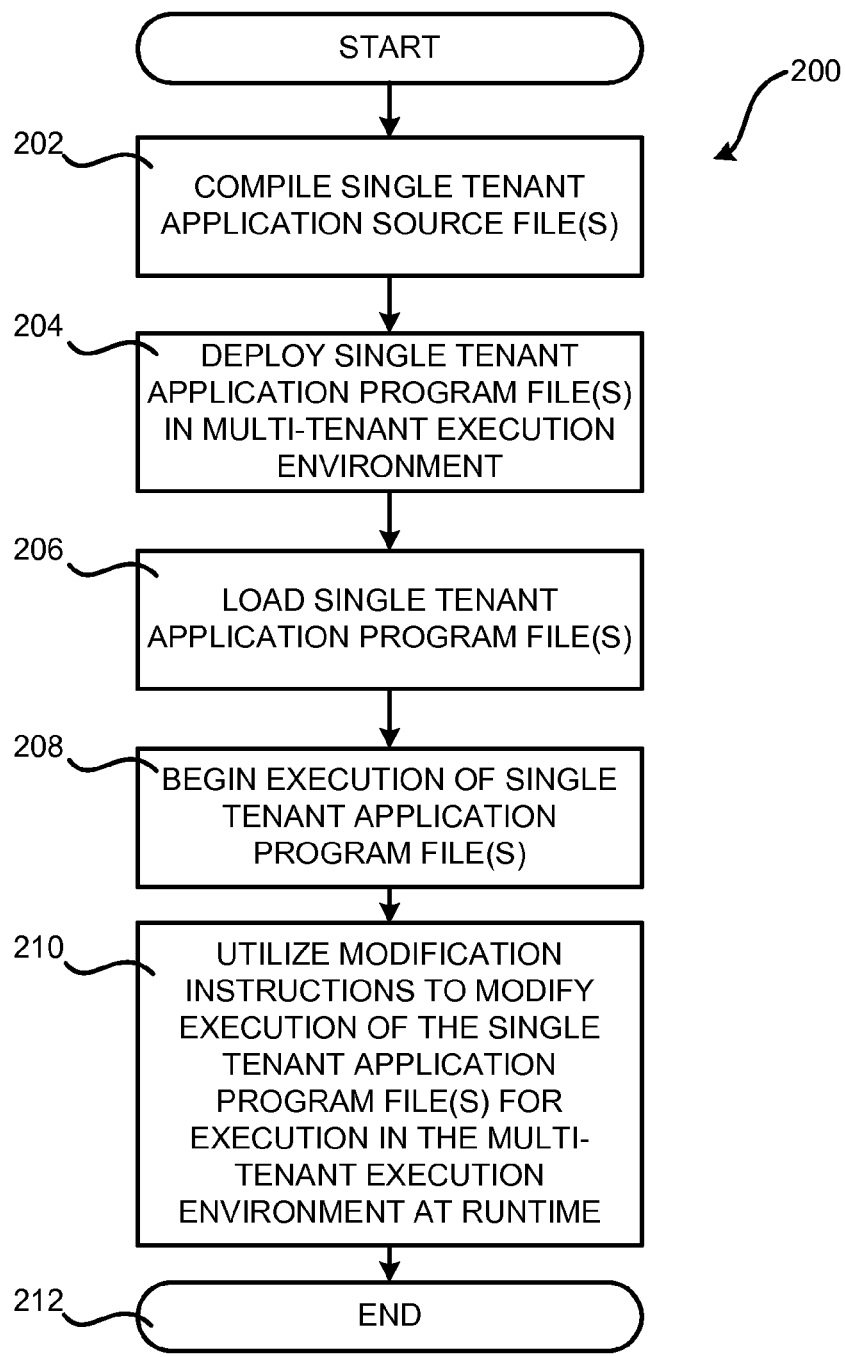
FIG. 2 is a flow diagram showing a routine that illustrates aspects of one mechanism disclosed herein for modification of program code at run time for execution in a multi-tenant execution environment.

FIG. 2 is a flow diagram showing a routine 200 that illustrates additional aspects of the mechanism shown in FIG. 1 for modification of program code at run time for execution in a multi-tenant execution environment 108. It should be appreciated that the logical operations described herein with respect to FIG. 2 and the other figures are implemented (1) as a sequence of computer implemented acts or program modules running on a computing system and/or (2) as interconnected machine logic circuits or circuit modules within the computing system. The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the FIGS. and described herein. These operations may also be performed in parallel, or in a different order than those described herein.

The routine 200 begins at operation 202, where the compiler 104 compiles the source file 102 to generate the program file 106. The routine 200 then proceeds from operation 202 to operation 204, where the program file 106 is deployed in the multi-tenant execution environment 108. For example, the program file 106 might be deployed in an application container configured to execute program code in process for multiple tenants in one particular implementation.

From operation 204, the routine 200 proceeds to operation 206, where the program loader 110 loads the program file 106. Once the program file 106 has been loaded, the routine 200 proceeds to operation 208, where the program loader 110 begins execution of the program file 106. In the case of a JAVA class file, for example, the program loader 110 may begin translating byte code in the program file 106 to machine-specific instructions at operation 208.

From operation 208, the routine 200 proceeds to operation 210, where the program loader 110 utilizes the modification instructions 114 in one implementation to modify the program file 106 for proper execution in the multi-tenant execution environment 108. As described above, the result of this process is a program file 112 that is configured for execution in the multi-tenant execution environment 108. Various types of modifications of the program file 106 that might be performed in various embodiments are described below. Additionally, as mentioned above, JAVA byte code weaving might be utilized to modify the program file 106 at run time for execution in the multi-tenant execution environment 108. Other mechanisms might also be utilized. From operation 210, the routine 200 proceeds to operation 212, where it ends.

According to various embodiments, the program file 106 might be modified in various ways to enable proper execution in the multi-tenant execution environment 108. For instance, in one embodiment, the program file 106 is modified to provide instrumentation data regarding the utilization of resources by the program code. Specifically, the program file 106 might be modified to expose data regarding the utilization of memory, processor cycles, or other types of resources.

In order to expose data regarding memory utilization, for instance, the program file 106 might be modified to calculate the size of a program when instantiated, and to increment a per-application counter using the calculated size when the program is instantiated and to decrement the counter when the program is garbage collected. In order to expose data regarding processor utilization, the program file 106 might be modified to count the number of byte code commands that will be executed in blocks of program code, and to increment a per application counter when execution of each block begins. As will be described in greater detail below, modification of program code to provide instrumentation data in this way might be utilized to generate run time context data that may be utilized to determine when to execute various portions of an application in a distributed manner. Additional details regarding this aspect of the disclosure presented herein will be provided below with regard to FIGS. 5 and 6.

In another embodiment, the program file 106 is modified to provide a per-tenant resource for a global resource defined by the program. In this way, tenant-specific resources can be provided to the program file 106 that appear to be global resources. For example, the program file 106 may be modified to provide per-tenant variables for static variables defined by the program file 106. This type of modification may be required when the program file 106 utilizes static variables that have a container-wide scope and that are referenced by multiple tenants. In this scenario, the program code might be modified to create per-tenant variables by utilizing a hash map that includes a unique value of the variable per thread. Other mechanisms might also be utilized to modify program code to maintain per-tenant variables rather than static variables.

In another embodiment, the program file 106 is modified to translate requests for process identifiers to requests for application identifiers. This type of modification might be performed when program code has a dependency upon context, like a process ID, which is rendered invalid when multiple tenants are executing in the same process. In this scenario, the program file 106 might be modified to return an application ID when a request for a process ID is received. Other types of modifications might be performed to resolve dependencies upon contextual information that are resolved incorrectly when program code executes in the multi-tenant execution environment 108.

In another embodiment, the program file 106 is modified to propagate context information to a thread local storage area associated with a thread created by the program code. It should be appreciated that the examples given above are merely illustrative and that program code might also be modified in other ways in order to enable the program code to properly execute within a multi-tenant execution environment, such as a multi-tenant application container.

Figure 3:
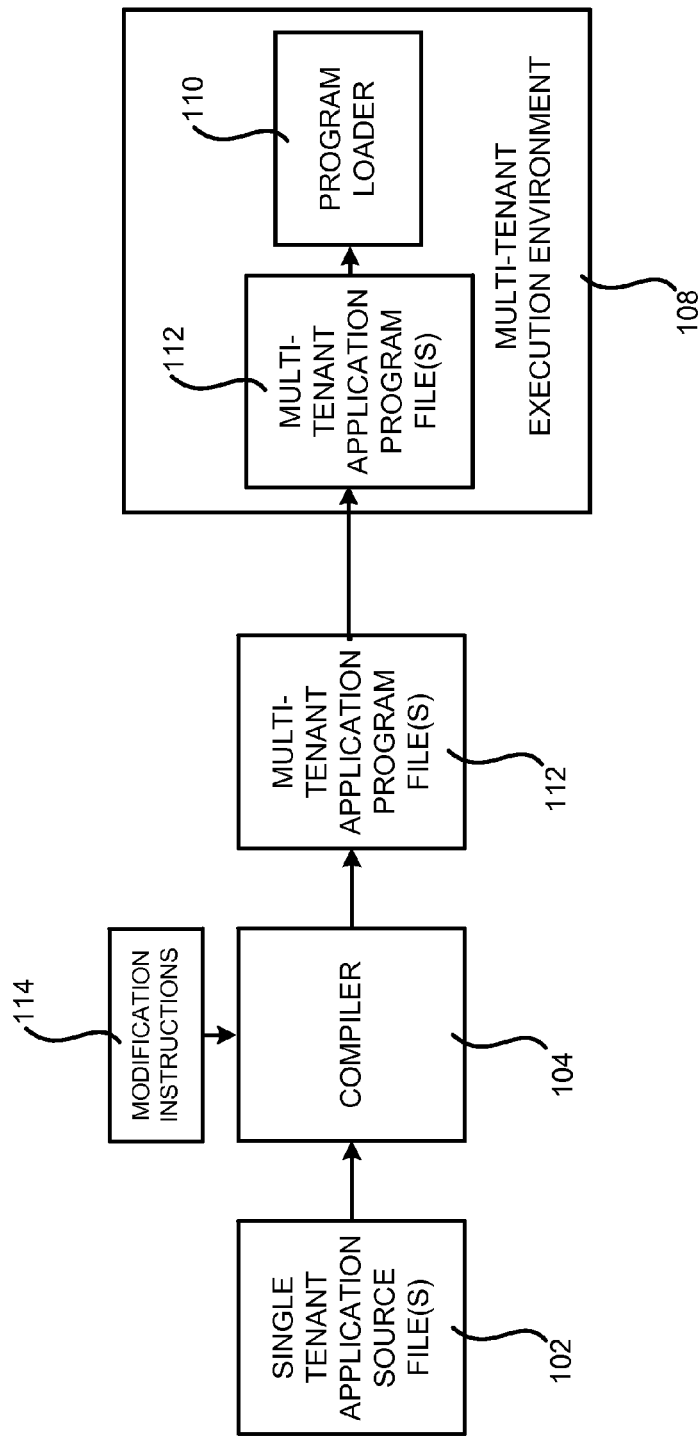
FIG. 3 is a software architecture diagram showing aspects of one illustrative mechanism described herein for modification of program code at compile time for execution in a multi-tenant execution environment.

FIG. 3 is a software architecture diagram showing aspects of one illustrative mechanism described herein for modification of program code at compile time for execution in a multi-tenant execution environment 108. In the example shown in FIG. 3, a process similar to that described above with regard to FIGS. 1 and 2 is performed. However, in the example shown in FIG. 3, program code is modified at compile time for execution in the multi-tenant execution environment 108 rather than at run time.

As described above with regard to FIG. 1, a source file 102 might be created that is not specifically configured for execution within a multi-tenant execution environment 108, like a multi-tenant container. In this example, however, the compiler 104 utilizes the modification instructions 114 to create a program file 112 that is configured for proper execution within the multi-tenant execution environment 108. For example, the compiler 104 might perform one or more of the modifications described above in order to create the program file 112. Modifications other than those specifically disclosed herein might also be performed. Once the program file 112 has been created, the program file 112 might be deployed in the multi-tenant execution environment 108 for execution by the program loader 110.

Figure 4:
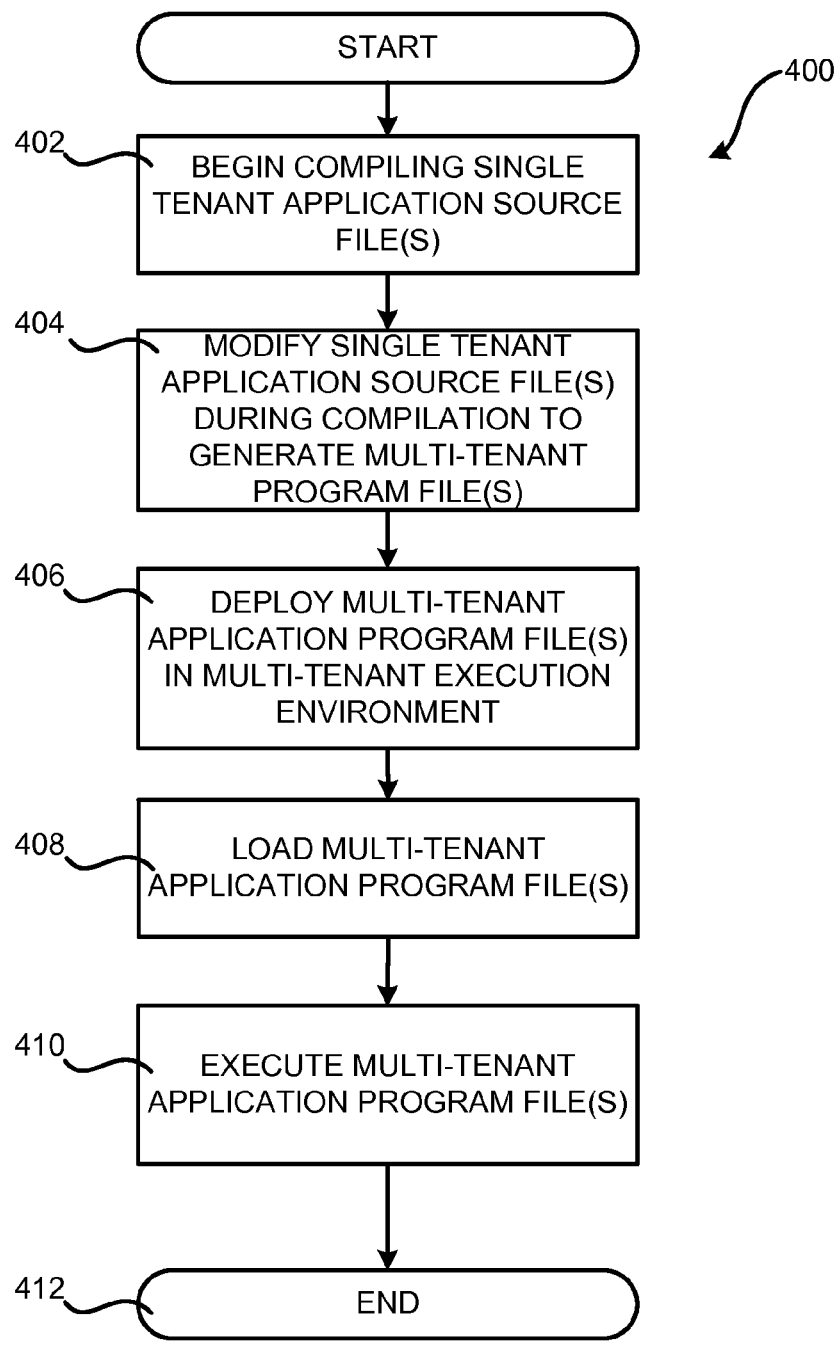
FIG. 4 is a flow diagram showing a routine that illustrates aspects of one mechanism disclosed herein for modification of program code at compile time for execution in a multi-tenant execution environment.

FIG. 4 is a flow diagram showing a routine 400 that describes additional aspects of the mechanism shown in FIG. 3 for modification of program code at compile time for execution in a multi-tenant execution environment 108. The routine 400 begins at operation 402, where the compiler 104 begins compiling the source file 102. As discussed above, the source file 102 is not configured for proper execution in a multi-tenant execution environment 108.

From operation 402, the routine 400 proceeds to operation 404, where the compiler 104 utilizes the modification instructions 114 to generate a program file 112 that is configured for proper execution in the multi-tenant execution environment 108. Once the program file 112 has been created, the routine 400 proceeds from operation 404 to operation 406.

At operation 406, the program file 112 is deployed into the multi-tenant execution environment 108 for execution. The routine 400 then proceeds to operation 408, where the program loader 110 loads the program file 112. Once the program file 112 has been loaded, the routine 408 proceeds to operation 410, where the program loader 110 executes the program file 112. The routine 400 then proceeds from operation 410 to operation 412, where it ends.

It should be appreciated that program code might also be modified in the manner disclosed herein at times other than run time, as discussed above with regard to FIGS. 1 and 2, and compile time, as discussed above with regard to FIGS. 3 and 4. For example, and as mentioned briefly above, program code might also be modified at the time the program code is deployed into the multi-tenant execution environment 108, at load time, after load time but before compile time, or at another time. Additionally, the program code might be modified multiple times in other embodiments in order to ensure compatibility with the multi-tenant execution environment 108. For example, program code might be modified at both compile time and run time.

Figure 5:
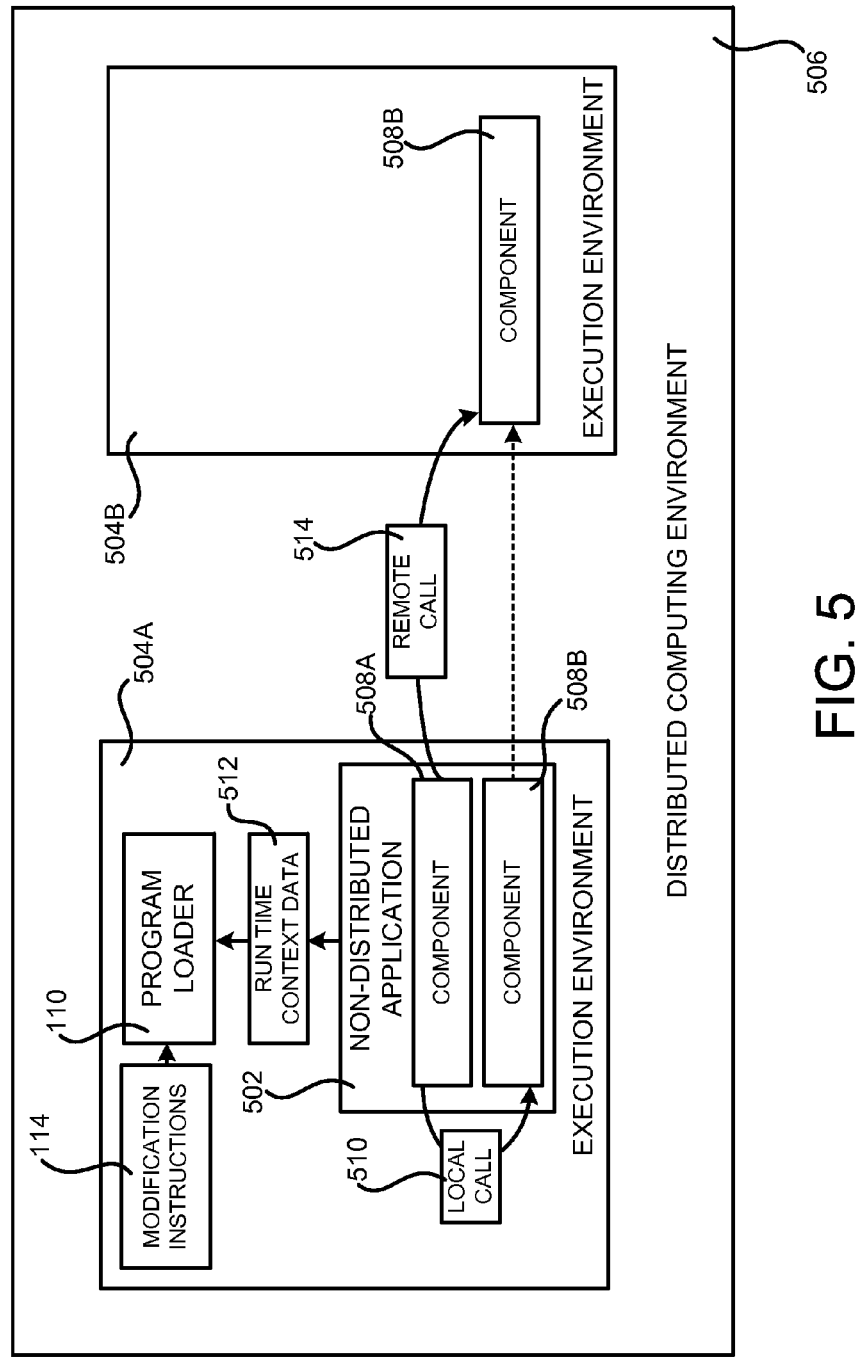
FIG. 5 is a software architecture diagram showing aspects of one illustrative mechanism described herein for modification of program code at run time for distributed execution.

FIG. 5 is a software architecture diagram showing aspects of one illustrative mechanism described herein for modification of program code at run time for distributed execution in a distributed computing environment 506. As described briefly above, various challenges might also be presented when applications are executed in execution environments in a distributed computing environment. For example, it might be difficult to scale the execution of application programs in a distributed computing environment 506, where components might be executed in a distributed fashion on multiple local or remotely located computing systems.

In order to address the problem described just above, and potentially others, program code such as an application program that has not been specifically programmed for distributed execution might be modified at run time to enable distributed execution. For example, and as shown in FIG. 5, an application 502 may be created that is not configured for distributed execution. The application 502 might be executed in an execution environment 504A, such as a single or multi-tenant application container, in a distributed computing environment 506.

During run time of the application 502, a determination may be made as to whether it is desirable to execute a portion of the application 502 in another instance of the execution environment 504B in the distributed computing environment 506. For example, if run time context data 512 indicates that a portion of the application 502, like one of the components 508A-508B, a module, a function, or another portion of the application 502, is in high demand or is using significant resources, a determination may be made to execute the portion of the application 502 in the other instance of the execution environment 504B.

In some implementations, the application 502 is modified at run time in the manner described above with regard to FIGS. 3 and 4 to generate run time context data 512 that describes the demand for the application 502 and/or its various components 508A and 508B. The application 502 might also be modified at run time in the manner described above with regard to FIGS. 3 and 4 to generate run time context data 512 that describes the resources utilized by the application 502 and/or its various components 508A and 508B.

If a determination is made to execute a portion of the application 502 in another instance of the execution environment 504B, the portion of the application 502 is then moved to the other instance of the execution environment 504B. For instance, in the example shown in FIG. 5, the component 508B of the application 502 has been moved from one instance of the execution environment 504A to a second instance of the execution environment 504B.

The second instance of the execution environment 504B might be executing on a different computer or even in another data center than the instance of the execution environment 504A. It should be appreciated that while the example shown in FIG. 5 includes moving a component 508B to another instance of an execution environment 504B, other portions of an application 502, such as functions, procedures, or other logical subdivisions of the application 502, might also be moved to other instances of execution environments 504 in a distributed computing environment 506 in other embodiments.

Once the component 508B has been moved to the instance of the execution environment 504B, the application 502 and, potentially the component 508B, might be modified at run time in order to permit the application 502 to execute properly in the distributed computing environment 506. For example, the program loader 110 might utilize the modification instructions 114 to enable the component 508A to communicate with the component 508B by way of a remote network call 514, rather than a local call 510. Other types of modifications might also be performed on the application 502, its components 508, and/or the moved portion of the application 502, such as the component 508B, in order to permit the application 502 to properly execute in a distributed fashion in the distributed computing environment 506.

Figure 6:
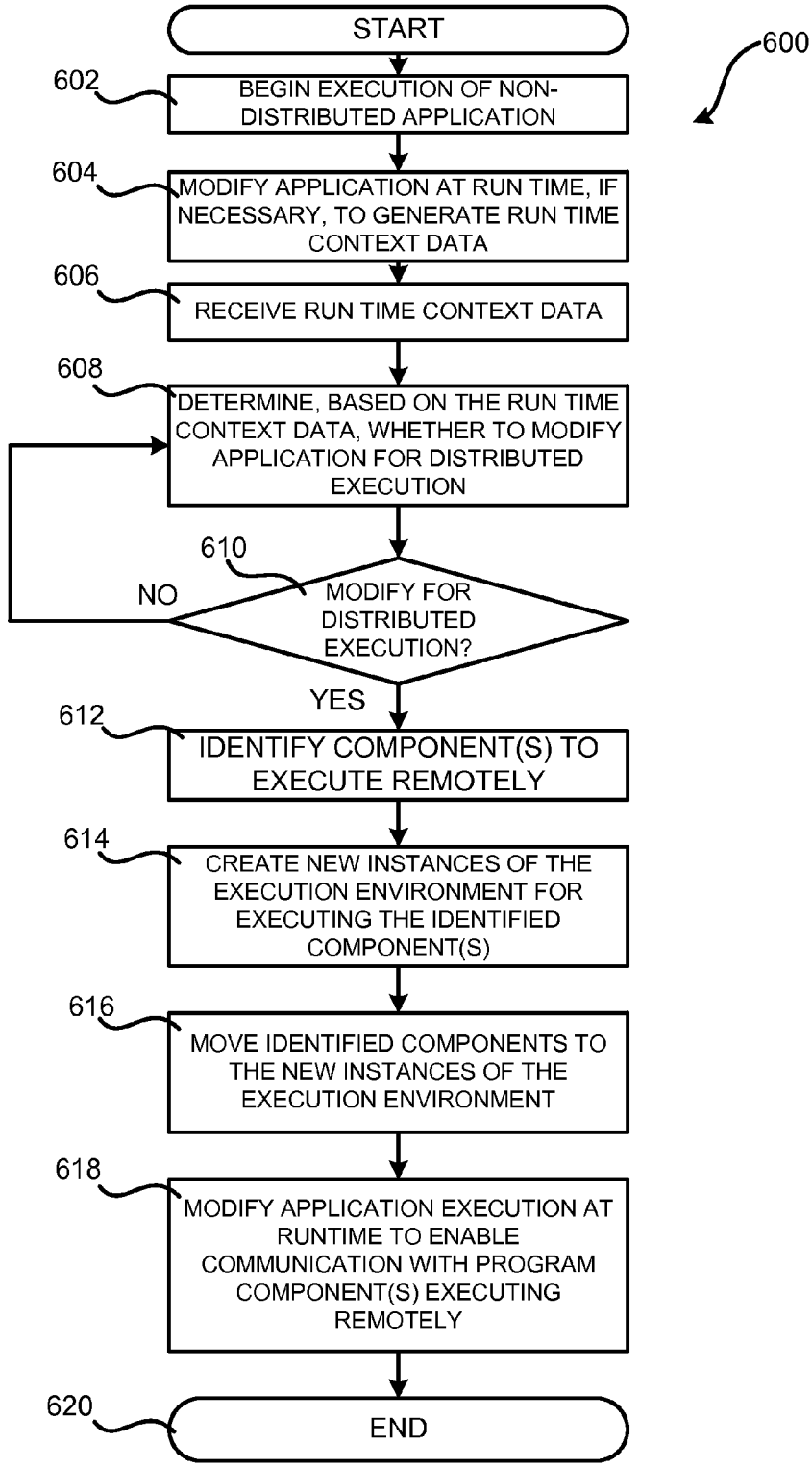
FIG. 6 is a flow diagram showing a routine that illustrates aspects of one mechanism disclosed herein for modification of program code at run time for distributed execution.

FIG. 6 is a flow diagram showing a routine 600 that illustrates additional aspects of the mechanism shown in FIG. 5 for modification of program code at run time for distributed execution in a distributed computing environment 506. The routine 600 begins at operation 602, where execution of the application 502 in the execution environment 504A begins. As discussed above, the application 502 is not configured for distributed execution.

From operation 602, the routine 600 proceeds to operation 604, where the application is modified, if necessary, to generate the run time context data 512. In particular, the mechanism described above with regard to FIGS. 1 and 2 might be utilized to modify the application 502 to generate the run time context data 512 if the application 502 has not already been configured to do so. As mentioned above, the run time context data 512 provides information regarding run time aspects of the application 502 such as, but not limited to, demand for the application 502 or its components 508, resources utilized by the application and/or or its components 508, and potentially other types of information. The program loader 110, or another component executing within the execution environment 504 receives the run time context data 512 at operation 606.

From operation 606, the routine 600 proceeds to operation 608, where a determination is made based upon the run time context data 512, whether to modify the application 502 at run time for distributed execution. For example, if one of the components 508 of the application 502 is in high demand, a determination may be made to move the component 508 in high demand to another instance of the execution environment 504B. Similarly, if one of the components 508 of the application 502 is utilizing a large amount of memory or processor resources, a determination may be made to move the component 508 utilizing the resources to another instance of the execution environment 504B.

If a determination is made to modify the application 502 for distributed execution, the routine 600 proceeds from operation 610 to operation 612. At operation 612, the portion of the application to be moved to the new instance of the execution environment 504B is identified. For example, the component, or components, that are experiencing high demand or utilizing large amounts of resources might be identified.

The routine 600 then proceeds from operation 612 to operation 614, where a new instance of the execution environment 504B might be created if one does not already exist. Once the new instance of the execution environment 504B has been created, the routine 500 proceeds from operation 614 to operation 616, where one or more portions of the application 502 are moved to the new instance of the execution environment 504B. For instance, in the example shown in FIG. 5 and described above, the component 502 has been moved from the execution environment 504A to the execution environment 504B.

Once the component 508B has been moved to the new instance of the execution environment 504, the application 502 is modified in order to enable communication with the portion of the application 502 that is not executing remotely. As mentioned above with regard to FIG. 5, for instance, the application 502 might be modified at run time to enable the component 508A to communicate with the component 508B by way of a remote network call 514, rather than a local call 510. Other types of modifications might also be performed on the application 502, its components 508, and/or the moved portion of the application 502, such as the component 508B, in order to permit the application 502 to properly execute in a distributed fashion in the distributed computing environment 506. From operation 618, the routine 600 proceeds to operation 620, where it ends.

It should be appreciated that the modification of the application 502 in the manner described above with regard to FIGS. 4 and 5 might also be discontinued based upon the run time context data 512. For example, if the run time context data 512 indicates that the demand for the component 508B has subsided, the component 508B might be moved back to the execution environment 504A and communication between the components 508A and 508B might resume utilizing local calls 510. It should be appreciated that other types of operations might also be performed based upon the run time context data 512.

Figure 7:
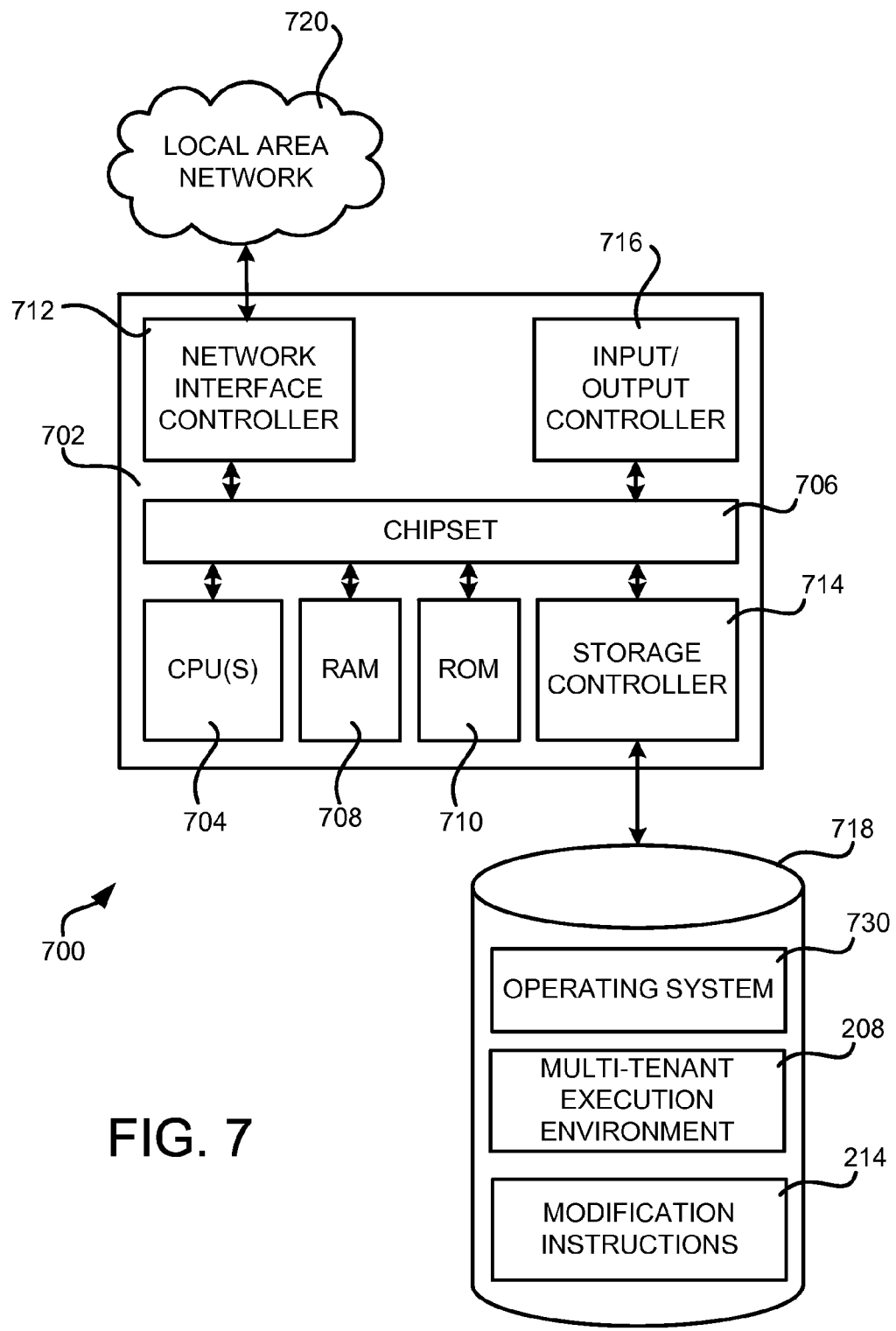
FIG. 7 is a computer architecture diagram showing an illustrative computer hardware architecture for implementing a computing device that might be utilized to implement aspects of the various embodiments presented herein.

FIG. 7 shows an example computer architecture for a computer 700 capable of executing the program components described above for modification of program code for execution in multi-tenant and/or distributed computing environments. The computer architecture shown in FIG. 7 illustrates a conventional server computer, workstation, desktop computer, laptop, tablet, network appliance, personal digital assistant ("PDA"), e-reader, digital cellular phone, or other computing device, and may be utilized to execute any aspects of the software components presented herein.

The computer 700 includes a baseboard 702, or "motherboard," which is a printed circuit board to which a multitude of components or devices may be connected by way of a system bus or other electrical communication paths. In one illustrative embodiment, one or more central processing units ("CPUs") 704 operate in conjunction with a chipset 706. The CPUs 704 may be standard programmable processors that perform arithmetic and logical operations necessary for the operation of the computer 700.

The CPUs 704 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 may provide an interface to a random access memory ("RAM") 708, used as the main memory in the computer 700. The chipset 706 may further provide an interface to a computer-readable storage medium such as a read-only memory ("ROM") 710 or non-volatile RAM ("NVRAM") for storing basic routines that help to startup the computer 700 and to transfer information between the various components and devices. The ROM 710 or NVRAM may also store other software components necessary for the operation of the computer 700 in accordance with the embodiments described herein.

The computer 700 may operate in a networked environment using logical connections to remote computing devices and computer systems through a network, such as the local area network 720. The chipset 706 may include functionality for providing network connectivity through a NIC 712, such as a gigabit Ethernet adapter. The NIC 712 is capable of connecting the computer 700 to other computing devices over the network 720. It should be appreciated that multiple NICs 712 may be present in the computer 700, connecting the computer to other types of networks and remote computer systems.

The computer 700 may be connected to a mass storage device 718 that provides non-volatile storage for the computer. The mass storage device 718 may store system programs, application programs, other program modules, and data, which have been described in greater detail herein. The mass storage device 718 may be connected to the computer 700 through a storage controller 714 connected to the chipset 706. The mass storage device 718 may consist of one or more physical storage units. The storage controller 714 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 700 may store data on the mass storage device 718 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 718 is characterized as primary or secondary storage, and the like.

For example, the computer 700 may store information to the mass storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 may further read information from the mass storage device 718 by detecting the physical states or characteristics of one or more particular locations within the physical storage units.

In addition to the mass storage device 718 described above, the computer 700 may have access to other computer-readable storage media to store and retrieve information, such as program modules, data structures, or other data. It should be appreciated by those skilled in the art that computer-readable storage media can be any available media that provides for the storage of non-transitory data and that may be accessed by the computer 700.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 718 may store an operating system 730 utilized to control the operation of the computer 700. According to one embodiment, the operating system comprises the LINUX operating system. According to another embodiment, the operating system comprises the WINDOWS® SERVER operating system from MICROSOFT Corporation. According to further embodiments, the operating system may comprise the UNIX or SOLARIS operating systems. It should be appreciated that other operating systems may also be utilized. The mass storage device 718 may store other system or application programs and data utilized by the computer 700, such as the modification instructions 214, a multi-tenant execution environment 208, such as an application container configured to execute applications for multiple tenants, and/or any of the other software components and data described above. The mass storage device 718 might also store other programs and data not specifically identified herein.

In one embodiment, the mass storage device 718 or other computer-readable storage media is encoded with computer-executable instructions which, when loaded into the computer 700, transforms the computer from a general-purpose computing system into a special-purpose computer capable of implementing the embodiments described herein. These computer-executable instructions transform the computer 700 by specifying how the CPUs 704 transition between states, as described above. According to one embodiment, the computer 700 has access to computer-readable storage media storing computer-executable instructions which, when executed by the computer 700, perform the various routines described above with regard to FIGS. 2, 4, and 6. The computer 700 might also include computer-readable storage media for performing any of the other computer-implemented operations described herein.

The computer 700 may also include one or more input/output controllers 716 for receiving and processing input from a number of input devices, such as a keyboard, a mouse, a touchpad, a touch screen, an electronic stylus, or other type of input device. Similarly, the input/output controller 716 may provide output to a display, such as a computer monitor, a flat-panel display, a digital projector, a printer, a plotter, or other type of output device. It will be appreciated that the computer 700 may not include all of the components shown in FIG. 7, may include other components that are not explicitly shown in FIG. 7, or may utilize an architecture completely different than that shown in FIG. 7.

Based on the foregoing, it should be appreciated that technologies for modification of program code for execution in multi-tenant and/or distributed computing environments have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A computer-implemented method for modification of program code for execution in a multi-tenant execution environment, the method comprising:
   receiving program code configured for execution in a single-tenant execution environment;
   receiving instructions for modifying the program code for execution in the single-tenant execution environment into a modified application for execution in a multi-tenant application container environment; and
   utilizing the instructions to configure the program code for execution in an instance of the multi-tenant application container, the multi-tenant application container configured to execute one or more applications for one or more tenants, wherein utilizing the instructions to configure the program code for execution in the multi-tenant application container comprises modifying the program code to provide a per-tenant resource that appears to the program code to be a global resource defined by the program code, the per-tenant resource comprising an application identifier and the global resource comprising a process identifier.

2. The computer-implemented method of claim 1, wherein the instructions are utilized at a compile time of the program code to configure the program code for execution in the multi-tenant application container.

3. The computer-implemented method of claim 1, wherein the instructions are utilized at a run time of the program code to configure the program code for execution in the multi-tenant application container.

4. The computer-implemented method of claim 1, wherein utilizing the instructions to configure the program code for execution in the multi-tenant application container comprises utilizing the instructions to modify the program code to provide instrumentation data regarding a utilization of resources by the program code.

5. The computer-implemented method of claim 1, wherein utilizing the instructions to configure the program code for execution in the multi-tenant application container comprises modifying the program code to propagate context information to a thread local storage area associated with a thread created by the program code.

6. The computer-implemented method of claim 1, further comprising determining to execute a portion of the program code in a first instance and in a second instance.

7. The computer-implemented method of claim 6, further comprising moving the portion of the program to a second application container for execution on a second computer.

8. A system, comprising:
one or more computing devices including one or more computer hardware processors, the one or more processors configured to:
modify an application configured for execution by a single tenant into a modified application for execution in a multi-tenant application container, the multi-tenant application container configured to execute one or more applications for a plurality of tenants, wherein modify the application for execution in the multi-tenant application container comprises modifying the application to provide a per-tenant resource that appears to the application to be a global resource defined by the application, the per-tenant resource comprising an application identifier and the global resource comprising a process identifier; and
execute the modified application in an instance of the multi-tenant application container.

9. The system of claim 8, wherein the application is modified for execution in the multi-tenant application container at a compile time of the application.

10. The system of claim 8, wherein the application is modified for execution in the multi-tenant application container at a run time of the application.

11. The system of claim 8, wherein modify the application for execution comprises modifying the application to provide instrumentation data regarding a utilization of resources by the application.

12. The system of claim 8, wherein modify the application for execution comprises modifying the application to propagate context information to a thread local storage area associated with a thread created by the application.

13. A non-transitory computer-readable storage medium having computer-executable instructions stored thereupon which, when executed by a computer, cause the computer to:
receive an application, the application configured for execution by a single tenant;
modify the application configured for execution by the single tenant to create a modified application for execution in a multi-tenant application container, the multi-tenant application container configured to execute one or more applications for a plurality of tenants;
wherein modify the application for execution in the multi-tenant application container comprises modifying a program code of the application to provide a per-tenant resource that appears to the program code to be a global resource defined by the program code, the per-tenant resource comprising an application identifier and the global resource comprising a process identifier; and
execute the modified application in an instance of the multi-tenant application container.

14. The non-transitory computer-readable storage medium of claim 13, wherein the application is modified for execution in the multi-tenant application container at a compile time of the application.

15. The non-transitory computer-readable storage medium of claim 13, wherein the application is modified for execution in the multi-tenant application container at a run time of the application.

16. The non-transitory computer-readable storage medium of claim 13, wherein modify the application for execution in the multi-tenant application container comprises modifying the application to provide instrumentation data regarding a utilization of resources by the application.

17. The non-transitory computer-readable storage medium of claim 13, wherein modify the application for execution in the multi-tenant application container comprises modifying the application to propagate context information to a thread local storage area associated with a thread created by the application.

18. The non-transitory computer-readable storage medium of claim 13, wherein the per-tenant resource comprises a per-tenant variable and wherein the global resource comprises a global variable.

19. The non-transitory computer-readable storage medium of claim 13, wherein the instructions, when executed by a computer, cause the computer to determine to execute at least a portion of the program code and to execute the portion of the program code in a first instance and in a second instance.

20. The non-transitory computer-readable storage medium of claim 19, wherein the instructions, when executed by a computer, cause the computer to move the portion of the program code to a second application container for execution on a second computer.

* * * * *